United States Patent
Joshi et al.

(10) Patent No.: US 9,749,180 B2
(45) Date of Patent: *Aug. 29, 2017

(54) TUNING LDAP SERVER AND DIRECTORY DATABASE

(71) Applicant: International Business Machines Corporation, Armonk, NY (US)

(72) Inventors: Chandrajit G. Joshi, Kothrud (IN); Romil J. Shah, Kothrud (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/204,940

(22) Filed: Jul. 7, 2016

(65) Prior Publication Data

US 2016/0323141 A1   Nov. 3, 2016

Related U.S. Application Data

(63) Continuation of application No. 12/609,238, filed on Oct. 30, 2009, now Pat. No. 9,397,976.

(51) Int. Cl.
*G06F 17/30* (2006.01)
*H04L 12/24* (2006.01)
(Continued)

(52) U.S. Cl.
CPC .... *H04L 41/0813* (2013.01); *G06F 17/30589* (2013.01); *H04L 61/1523* (2013.01); *H04L 67/42* (2013.01)

(58) Field of Classification Search
CPC ............. G06F 17/30589; G06F 3/1205; G06F 3/1253; G06F 3/1288; G06F 9/445;
(Continued)

(56) References Cited

U.S. PATENT DOCUMENTS 5,668,987 A   9/1997 Schneider
6,539,382 B1  3/2003 Byrne et al.
(Continued)

FOREIGN PATENT DOCUMENTS

WO   WO2005116871 A1   12/2005

OTHER PUBLICATIONS

IBM corporation "IBM Tivoli Directory Server Performance Tuning Guide, Version 5.2", Oct. 2003, First Edition, pp. 1-56.*
(Continued)

*Primary Examiner* — Dinku Gebresenbet
(74) *Attorney, Agent, or Firm* — Yee & Associates, P.C.; Jeffrey S. LaBaw

(57) ABSTRACT

A method and system for autonomously tuning a Lightweight Directory Access Protocol (LDAP) server are disclosed. The method comprises activating a tuning thread when defined conditions are met; and using this thread to initiate automatically a tuning procedure to tune an LDAP server cache, to tune a database buffer pool for the server, and to perform runtime tuning of parameters of the database. Tuning may be initiated upon reaching a specified time, or when the cache hit ratio of the server falls below a given threshold or on issuing the extended operation. The tuning procedure may include Basic or Advanced Tuning procedures and an Advanced Tuning procedure. The Basic Tuning procedure is comprised of static tuning of the server based on the number and size of entries in the database, and the Advanced Tuning Procedure is a real time procedure based on real client search patterns.

24 Claims, 11 Drawing Sheets

(51) Int. Cl.
*H04L 29/12* (2006.01)
*H04L 29/06* (2006.01)

(58) Field of Classification Search
CPC . H04L 61/1523; H04L 41/0813; H04L 67/42; H04L 29/12084
See application file for complete search history.

(56) References Cited

U.S. PATENT DOCUMENTS

| | | | |
|---|---|---|---|
| 7,020,758 | B2 | 3/2006 | Fisk |
| 7,035,840 | B2 | 4/2006 | Nakos et al. |
| 7,383,287 | B2 | 6/2008 | Ellison et al. |
| 9,397,976 | B2 | 7/2016 | Joshi et al. |
| 2002/0046204 | A1 | 4/2002 | Hayes |
| 2002/0156980 | A1* | 10/2002 | Rodriguez ............ G06F 12/121 711/136 |
| 2005/0049992 | A1* | 3/2005 | Gupta ............... G06F 17/30315 |
| 2005/0086195 | A1* | 4/2005 | Tan ................... G06F 17/30289 |
| 2005/0283458 | A1* | 12/2005 | Galindo-Legaria ......................... G06F 17/30457 |
| 2007/0136238 | A1* | 6/2007 | Bildhaeuser ...... G06F 17/30457 |
| 2007/0240231 | A1* | 10/2007 | Haswarey ........... G06F 21/6218 726/28 |
| 2007/0244987 | A1* | 10/2007 | Pedersen ............. H04L 63/0272 709/217 |
| 2008/0294648 | A1* | 11/2008 | Lin ................... G06F 17/30362 |
| 2009/0055812 | A1 | 2/2009 | Smith |
| 2009/0182946 | A1 | 7/2009 | Zhou et al. |
| 2011/0106754 | A1 | 5/2011 | Joshi et al. |

OTHER PUBLICATIONS

"LDAP performance tuning for IBM Workplace Collaborative Learning," International Business Machines Corporation, Feb. 2005, 2 pages. http://publib.boulder.ibm.com/infocenter/iwphelp/v2r5m1/index.jsp?topic=/com.ibm.wcs.ic.doc_2.5.1/infocenter/i_wcl_c_perf_tuning_ldap.html.

"OpenLDAP Performance Tuning 6.0," Zimbra, Inc., Sep. 2009. 7 pages. http://wiki.zimbra.com/index.php?title=OpenLDAP_Performance_Tuning_6.0.

Chen et al., "Adaptive Database Buffer Allocation Using Query Feedback," Proceedings of the 19th International Conference on Very Large Data Bases (VLDB'93), Aug. 1993, pp. 342-353.

Faloutsos et al., "Flexible and Adaptable Buffer Management Techniques for Database Management Systems," IEEE Transactions on Computers, vol. 44, No. 4, Apr. 1995, 31 pages.

Petkus, "OpenLDAP Configuration and Tuning in the Enterprise," HEPiX Fall 2005 at SLAC, Oct. 2005, 19 pages. http://www.slac.stanford.edu/conf/hepix05/talks/tuesday/petkus.pdf.

Wu et al, "Using Real-Time Traffic Pattern Detection for Dynamic Cache Size Tuning in Information Retrieval," Proceedings of the Third International Conference on Information Technology and Applications(ICITA'05), Jul. 2005, pp. 35-40.

Office Action, dated Oct. 12, 2011, regarding U.S. Appl. No. 12/609,238, 14 pages.

Final Office Action, dated Apr. 26, 2012, regarding U.S. Appl. No. 12/609,238, 17 pages.

Notice of Allowance, dated Apr. 21, 2011, regarding U.S. Appl. No. 12/609,238, 20 pages.

* cited by examiner

Table 1:
Configuration of Performance Tuning Parameters (DN of PerfTune Entry in the Directory Server Configuration File)

Dn: cn=PERF,cn=configuration
Perf_tuning_enabled: false
Perf_day:
Perf_time:
Perf_realtime_op: false
Perf_system_memory_allotted: <percentage of system memory to be allotted to LDAP>
Perf_entry_cache_quota: <percentage of entry to be cached in LDAP server>
Perf_total-entry: <total number of entries present in the server database>
Perf_avg_entry_size: <average size of entry present in the server database>
Perf_search_threshold_ratio: <ratio in percentage>
Description of the attributes mentioned above:

Perf_tuning_enabled: LDAP performance tuning engine on LDAP server startup looks for the value of attribute Perf - tuning_enabled. If it is set to "true", the control is passed to the Tuning Engine. Tuning Engine looks for the attribute "Perf_realtime_op". If it is set to "false" then Tuning engine triggers the basic tuning operation. If set to "true" then Advanced Tuning operation will be triggered
Perf_day: Name of the day on which perform performance tuning. (Mon, Tue etc.) is to be triggered
Perf_time: Time (in hours 01 - 24) at which performance tuning operation is to be triggered.
Perf_realtime_op: If set to "true", it indicates Advanced Tuning operation is to be performed, else it indicates Basic Tuning
Perf - system - memory_allotted: Amount of system memory that administrator is planning to allot to server. If not specified then the default value i.e. 90% of system memory will be considered. This is the total memory that will be devoted to the directory server instance and will be used as an input to the performance tuning engine while tuning the LDAP cache and RDBM bufferpools.
Perf_total_entry: Total number of entries that will reside or are present in the directory database. If the value of this attributs is set to 0, performance tuning engine will fetch the total number of entries that are currently present in the directory database and assigned it to this attribute. The value assigned to Perf_total_entry will be used for tuning purpose.
Perf_avg_entry_size: Average size of entries that will reside or are present in the directory database. If the value of this attribute is set to 0, performance tuning engine will fetch the average size of entry based on the average size of entry currently stored in the directory server and assigned it to this attribute. The current value assigned to Perf_avg_entry_size will be used to for tuning purpose.
Perf-search-threshold-ratio: Value defining the LDAP cache hit ratio, this value is used as one of the factor to trigger performance tuning operation in the LDAP server.

FIG. 11

TUNING LDAP SERVER AND DIRECTORY DATABASE

CROSS-REFERENCE TO RELATED APPLICATION(S)

This application is a continuation of and claims the benefit of priority to U.S. patent application Ser. No. 12/609,238, filed on Oct. 30, 2009, the contents of which are incorporated herein by reference.

BACKGROUND

Light Weight Directory Access Protocol (LDAP) has become very popular due to its efficient and fast data access. A large number of applications/servers are currently being developed which use an LDAP directory as their centralized data repository. In the LDAP directory, data is stored as entries including key/value pairs. A key/value pair may include an attribute name and an attribute value. For example, an entry for an attribute known as a file type attribute may include a specific file type as the attribute name and the content of the file as the attribute value.

Some file types may include a set of metadata stored inside the file. For example, jpeg photo Exchangeable Image File Format (EXIF) used for compressed digital camera images includes multiple metadata fields for describing properties of an image stored in the file. These properties may specify the date when the picture was taken, the camera model used for taking the picture, the vertical and horizontal size of the picture, etc. This additional information might be useful for performing searches of the LDAP directory.

In order to maintain optimal performance, an LDAP server needs tuning at regular intervals based on the type of client requests, and type of data stored in the LDAP server database. Typically, administrators decide on a maintenance time, when they can analyze the tuning parameters and manually adjust the values of several tuning parameters. The types of tuning performed by the administrators are: LDAP Server Tuning and LDAP Server Database Tuning.

LDAP Server Tuning monitors the cache hit and miss ratio for the client search requests. This is done by monitoring several LDAP cache monitoring parameters provided by the server. Based on this analysis, the value of LDAP cache is tuned. If the LDAP cache miss ratio is high, then the size of LDAP cache is increased. Note that LDAP cache and entry cache are used interchangeably, but both of them essentially mean the same.

For improved performance of directory server, administrator needs to tune the LDAP server database cache. In this tuning, the LDAP server and database are stressed using some third party tools. Based on the analysis report, the LDAP server database cache is tuned. The stress engine is run again to see if the throughput for SEARCH operations is improved. If not, the LDAP server database cache is increased and the stressing cycle is run again. This cycle needs to be repeated until optimal search rate is observed. For example, SLAMD is a Sun one directory server stress tool which is used to stress the LDAP Server and generate an analysis report.

These tuning procedures, for example, involve a lot of manual efforts by the administrators, and the administrators should be well educated on what/how/when of the tuning parameters to be tuned. Also, the administrator needs to prepare the workload to be executed for analysis of tuning parameter. Workload is the design or the template that will be fed into the stress engine. Further, the administrator needs to be trained on the stress engine tool that will be used to run the workload.

SUMMARY

Embodiments of the invention provide a method and system for autonomously tuning a Lightweight Directory Access Protocol (LDAP) server. It should be obvious to one skilled in the art that the method can be implemented by means of a computer program stored on a suitable media when the computer program is loaded and executed on the system. The method comprises activating a tuning thread when defined conditions are met; and using said tuning thread to initiate automatically a tuning procedure to tune an LDAP server cache, to tune a database buffer pool for the server, and to perform runtime tuning of given parameters of the LDAP database. For example, the defined conditions may include reaching a specified time, or when the cache hit ratio of the server falls below a given threshold value, or in response to a command issued by the administrator (like an extended operation request).

The tuning procedure may include one or both of a Basic Tuning procedure and an Advanced Tuning procedure. The Basic Tuning procedure is comprised of static tuning of the server based on the total number of entries in the database and the average size of said entries. The Advanced Tuning Procedure is comprised of runtime tuning of the server based on real client search patterns, number of directory entries and the average size of entry.

A further embodiment of the invention, described in detail below, provides a number of important features including auto tuning of LDAP server cache, auto tuning of buffer pool (database cache), and runtime tuning of critical database parameters. The LDAP server cache is the first place which should be tuned properly by the administrators, because it is first place where the server looks for the entries requested by the client SEARCH requests. If entry is not found in the LDAP server cache, then database query is executed to search for the entry in the LDAP database. The LDAP database buffer pool is the database cache, which is looked for if the entries are not found in the LDAP server cache. It is always recommended to have some optimum value for LDAP database buffer pools so that there is no overhead in searching the requested entry in the database tables. Every database that is used with the LDAP server comes with a set of tuning parameters that can be tuned to avail optimal performance of the server.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIG. 11 is an exemplary embodiment of a table that describes several attributes that may be used.

DETAILED DESCRIPTION

Embodiments of the invention provide a system, an apparatus and a method for autonomous tuning of the LDAP servers and directory databases. As such, embodiments of the invention may be implemented in an LDAP directory server computing device which is part of a distributed data processing system. Therefore, a brief explanation of a distributed data processing environment will first be provided in order to give a context to the description of the preferred embodiment of the present invention.

Figure 1:
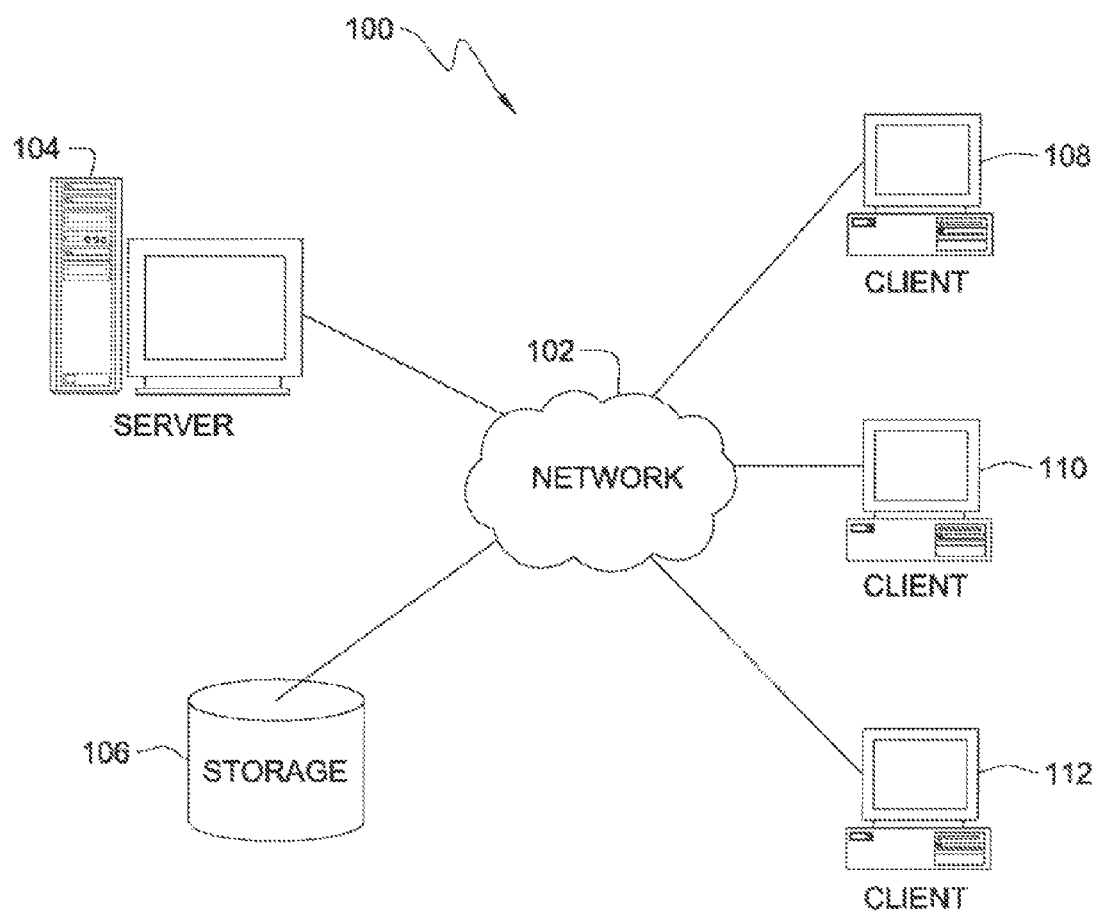
FIG. 1 is an exemplary distributed data processing system in which embodiments of the invention may be implemented.

Reference is now made to FIG. 1, which depicts a pictorial representation, by way of an exemplary embodiment, of a network of data processing systems in which embodiments of the invention may be implemented. Network data processing system 100 is a network of computers in which embodiments of the invention may be implemented. Network data processing system 100 contains a network 102, which is the medium used to provide communications links between various devices and computers connected together within network data processing system 100. Network 102 may include connections, such as wire, wireless communication links, or fiber optic cables.

In the example depicted, server 104 is connected to network 102 along with storage unit 106. In addition, clients 108, 110, and 112 are connected to network 102. These clients 108, 110, and 112 may be, for example, personal computers or network computers. In this example, server 104 provides data, such as boot files, operating system images, and applications to clients 108-112. Clients 108, 110, and 112 are clients to server 104. Network data processing system 100 may include additional servers, clients, and other devices not shown.

In the example illustrated, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the embodiments of this invention.

Figure 2:
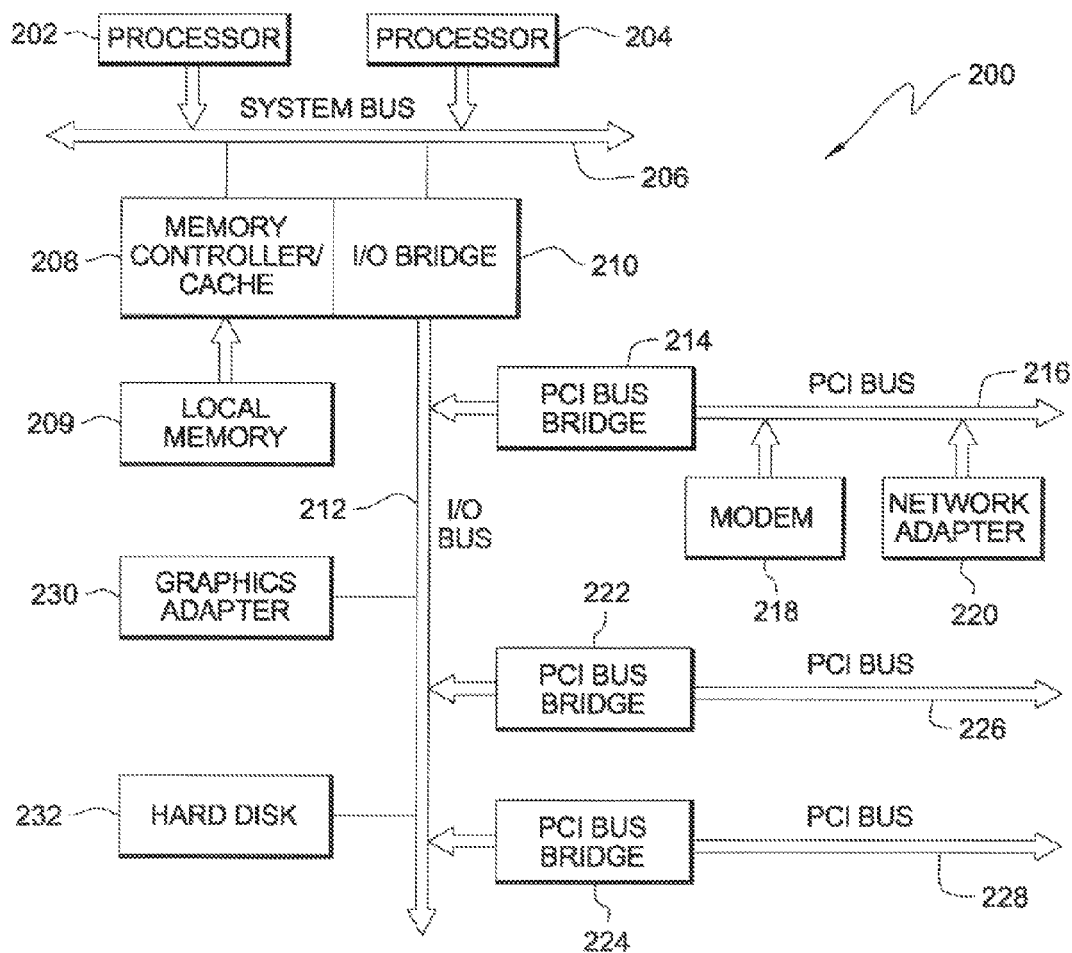
FIG. 2 is an exemplary server-computing device that may be used as an LDAP server in FIG. 1.

Reference is now made to FIG. 2, an exemplary embodiment of a block diagram of a data processing system that may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

A person of ordinary skill in the art will appreciate that the hardware depicted in FIG. 2 may vary from the components that are shown. For example, other peripheral devices, such as optical disk drives and the like, may also be used in addition to or in place of the hardware depicted. The depicted example is not meant to imply architectural limitations with respect to any of the embodiments of the invention. The data processing system depicted in FIG. 2 may be, for example, an computer system or a portable electronic system, running an operating system, for example the UNIX or the LINUX operating system.

Figure 3:
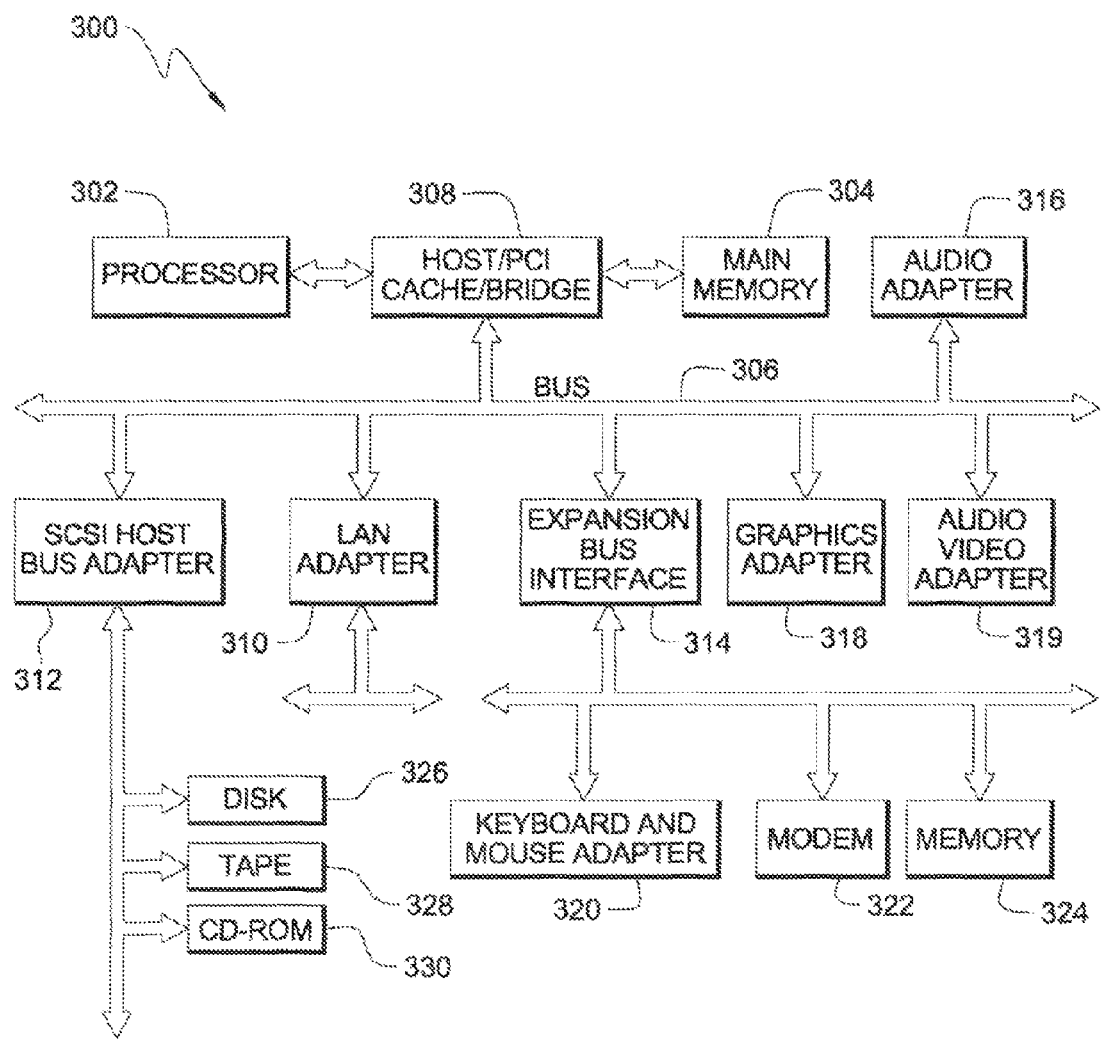
FIG. 3 is an exemplary a client device that may be used with an LDAP directory server in FIG. 1.

With reference now to FIG. 3, an exemplary embodiment of a block diagram illustrating a data processing system is depicted in which embodiments of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the example given in FIG. 3, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

A person of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the embodiments of the invention may be applied to a multiprocessor data processing system.

As a further example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide nonvolatile memory for storing operating system files and/or user-generated data.

The example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
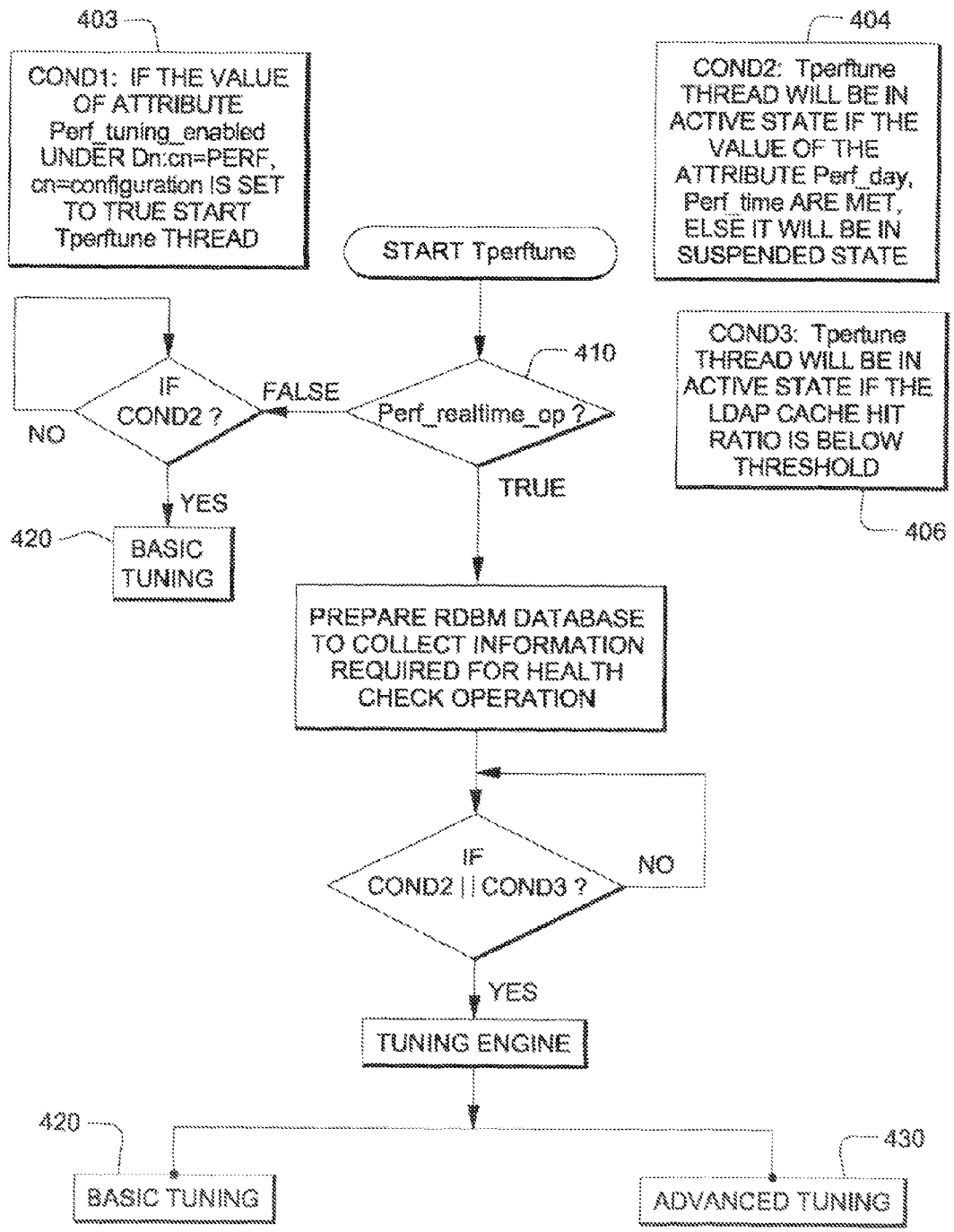
FIG. 4 illustrates an exemplary embodiment of a high-level control flow to trigger performance of a tuning operation.

As mentioned above, embodiments of the invention provides a method and system for autonomous tuning of LDAP servers and directory databases; and FIG. 4 describes an exemplary embodiment of the high-level control flows, to trigger the performance tuning operation that is Basic Tuning or Advanced Tuning or both.

As indicated in FIG. 4, three conditions are taken into account before these tuning operations are triggered. A first of these conditions, represented at 402, is that the value of an attribute Perf_tuning_enabled is set to true. A second condition, represented at 404, is that the Tperftune thread is active because a specified time has been reached; and the third condition, represented at 406, is that Tperftune thread is active because the LDAP cache hit ratio is below a given threshold.

More specifically, the performance tuning operation is triggered in the server by a server thread "Tperftune". During server startup or in response to the extended operation, the tuning configuration entry in the server configuration file is read i.e dn:cn=PERF, cn=configuration (See Table 1 of FIG. 11).

Syntax of LDAP ExOp to start Tperftune thread in server: ldapexop-D <bind dn >-w <bind passoword >-op 21 TuningOp>

The details of the tuning entry are available in the Table 1 (FIG. 11). If the value of attribute Perf_tuning_enabled: is set to true, then the Tperftune thread will be created and moved into inactive state. The Tperftune thread will become active for tuning operation based on either of the following the triggering conditions:

1. If the time specified in the attribute Perf_day, Perf_time in the tuning entry is reached; or 2. If the LDAP cache hit ratio falls below the configurable threshold value. The threshold value is a configurable parameter defined as an attribute value pair in the tuning entry dn:cn=Perf, cn=configuration; or 3. If the administrator issues the extended operation.

Figure 5:
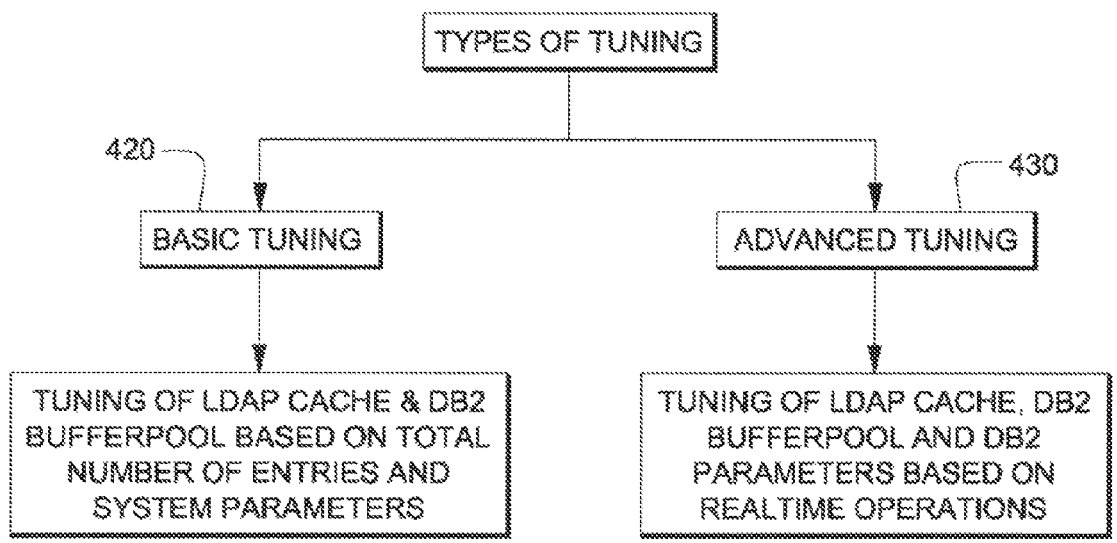
FIG. 5 illustrates an exemplary embodiment of the type of tuning performed.

As indicated in FIG. 4 and FIG. 5, the types of tuning can be performed in the implementation of an embodiment of the invention. These types of tuning are referred to as Basic Tuning, represented at 420 in FIGS. 4 and 5, and Advanced Tuning, represented at 430 in FIGS. 4 and 5. Basic Tuning consists of more of static tuning of the directory server based on the total number of entries present in the database, the average size of entry present in the database, and a few configurable parameters that can be set by the administrator.

Based on these values, the directory server tunes all the performance tuning factors, which is basically comprised of LDAP Cache and directory database cache. Basic tuning module can be triggered on server startup by reading server configuration file or using LDAP ExOp. The details of the configuration entry and its parameters are available in Table 1 (FIG. 11). Basic tuning module analyzes and tunes LDAP server cache and database buffer pools, which are considered to be the most critical tuning factors to improve the performance of directory server. Administrator can opt for Basic Tuning operation during server maintenance period or during deployment of the server by feeding in all the inputs in the configuration entry for performance. This activity needs to be repeated at regular interval to keep the LDAP server/database tuning parameter acceptable condition.

Figure 6:
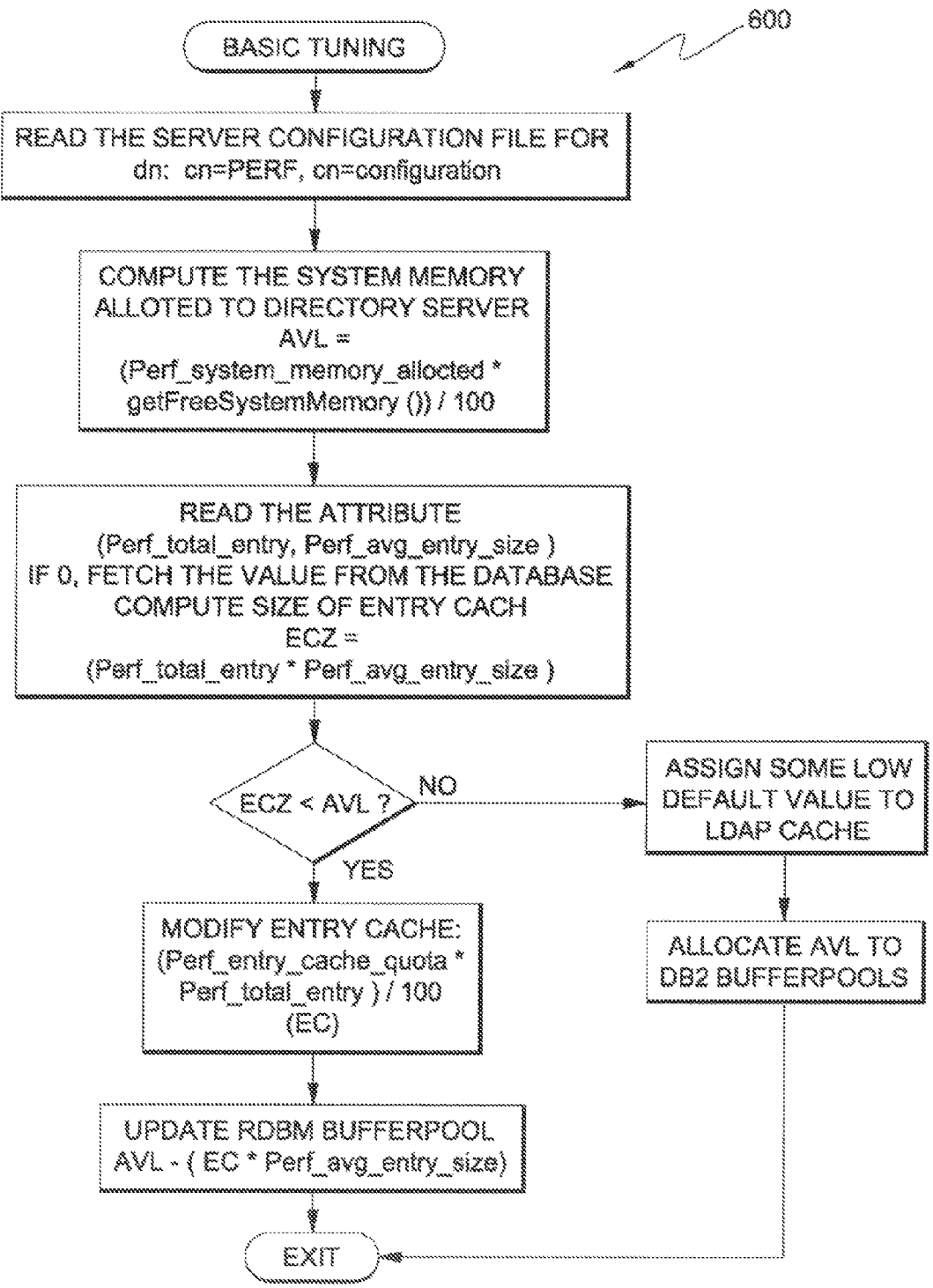
FIG. 6 illustrates an exemplary embodiment of an operation within a Basic Tuning Module.

FIG. 6 describes the operation, generally referenced at 600, that is performed by Basic tuning module. In LDAP, the performance factor is largely dependent on the cache available to store the LDAP entries. The priority would be given to LDAP cache followed by database buffer pools. If the size of these caches is large, fewer expensive disk I/O's are needed. The Entry Cache in the LDAP, where all entries are stored, is one of the most important caches that affects the performance of LDAP server. The Basic Tuning module evaluates the size of system memory that is allotted to LDAP sever and the Entry Cache size requirement is based on the configuration parameters Perf_system_memory_alloted, Perf_total_entry, Perf_avg_entry_size. These parameters are described in more detail in Table 1 (FIG. 11). If the amount of system memory allotted to LDAP server (specified by administrator as a tuning entry configuration parameter) is large enough to handle the current entry cache size, then the LDAP Entry Cache is modified to new size that is computed by the following formulas:

(Perf_system_memory_alloted*getFreeSystem
  Memory( )/100>
  (Perf_entry_cache_quota*Perf_total_entry)*Perf_avg_entry_size LDAP entry cache=
  (Perf_entry_cache_quota*Perf_total_entry)

LDAP entry cache is total number of entry to be cached in the server.

Since database buffer pool is the next target area for performance, all the LDAP System memory left over is preferably assigned to these buffer pools i.e.

(Perf_system_memory_alloted*getFreeSystem
  Memory( )/100−
  (Perf_entry_cache_quota*Perf_total_entry)*Perf_avg_entry_size Table 1 (FIG. 11) provides a more detailed description of all the attributes mentioned in the formulae given above.

Advanced tuning is comprised tuning of directory server based on the real client search patterns, number of directory entries and the average size of the entry. Real customer search patterns are collected and stored in the flat files and are used at regular intervals, for example, based on the time interval specified in the configuration attribute (Ref: Table 1), by the advanced tuning engine to stress, analyze and tune directory server cache and RDBM buffer pools and several database parameters to gain optimal performance from server. This module thus covers Basic Tuning operation along with other critical parameter tuning. Like basic tuning, advanced tuning is also performed at runtime if any one of the conditions as shown in FIG. 4 is met. This tuning is done based on the configuration parameters present in the tuning configuration entry (See Table 1). Advanced tuning operation is initiated by the "Tperftune" thread of the server, if either of the following condition is satisfied:

1. If the time specified in the attribute Perf_day, Perf_time in the tuning entry dn:cn=Perf, cn=configuration is reached; or
2. If the LDAP cache hit ratio falls below a threshold value. The threshold value is a configurable parameter defined as an attribute value pair in the tuning entry dn:cn=Perf, cn=configuration; or
3. If administrator issue extended operation.

Figure 7:
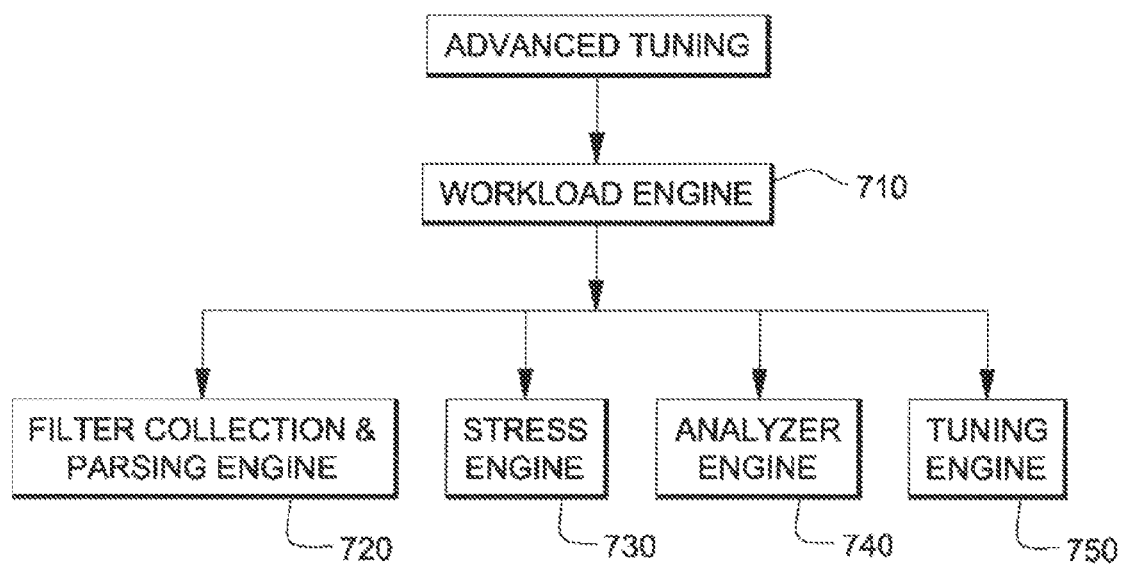
FIG. 7 describes exemplary embodiments of several engines within an Advanced Tuning Component.
Figure 8:
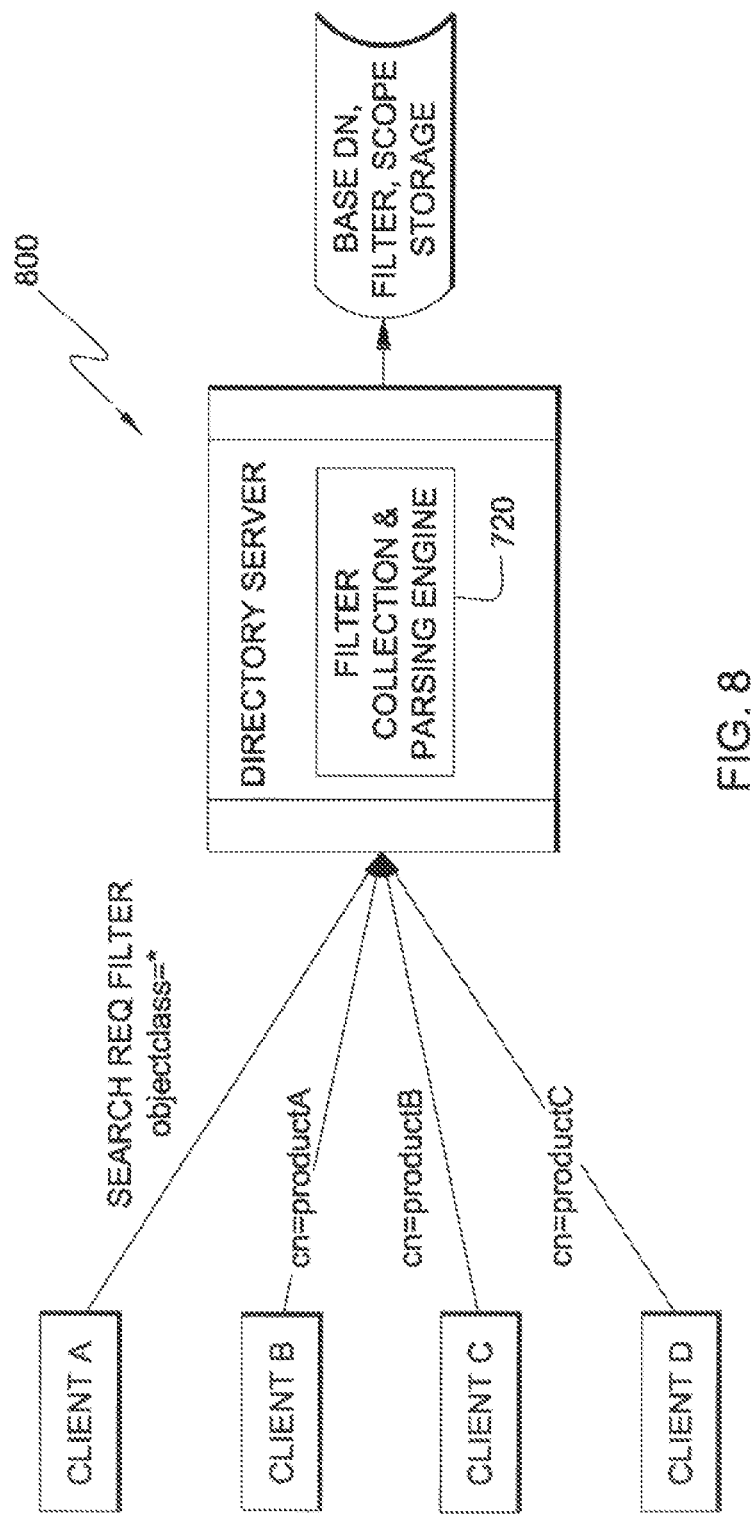
FIG. 8 illustrates an exemplary embodiment of an operation of the Filter Collection and Parsing Engine of FIG. 7.

FIG. 7 shows an exemplary embodiment of the Workload Engine 710 that is used in the Advanced Tuning, and several engines within that Workload Engine. The Workload Engine is responsible for stressing the server based on real customer search patterns, analyzing the results and for tuning of the directory server. The preferred embodiment of the Workload Engine includes a Filler Collection and Parsing Engine 720, a Stress Engine 730, an Analyzer Engine 740, and a Tuning Engine 750.

The Filter Collection and Parsing Engine 720 is used to collect the real customer search patterns. The parser is used to parse the search requests and to store the search filter, scope of search and DN in a flat file. Each pattern stored will be unique in itself. The Stress Engine 730 is used to stress the server. This basically comprises reading the search patterns stored in the flat files and triggering multiple searches (i.e SearchA, SearchB, . . . SearchN) using multiple clients and multiple threads within the same client to stress the directory server. The search operation triggered is based on the real customer search patterns collected by the Filter collection and Parsing engine. It may be noted that administrators are suggested to perform this activity in the time period when the server load is less. (i.e., when the number of client operations is small, or during maintenance period) as, when tuning operation is being performed by this engine, the performance of the server might be impacted.

The Analyzer Engine 740 is used to analyze directory server and database parameters. Parameters analyzed by this engine include the LDAP cache, the Database buffer pools, and the database parameters. Once the Stress Engine performs its task, the Analyzer engine starts its operation described below.

First, the Analyzer Engine fetches the total number of entries and the average size of entries present in the database. This can be obtained from the table where all the entries and the size of each entry are stored. Next, the Analyzer Engine evaluates the health of the database parameters. Every database vendor provides set of database configuration parameters and methods of tuning these parameters so as to achieve optimal performance out of the database management system. This can be taken as a reference in this design.

The next step is to evaluate the LDAP cache hit ratio. If the ratio is below the threshold value as defined under the tuning entry "cn=Perf, cn=configuration", then the "TuningRequired" flag is set to true. This is an indication that the entire tuning cycle needs to be repeated after tuning the value of LDAP cache, RDBM buffer pools and RDBM parameters by invoking Tuning Engine. The tuning cycle should be executed again to check if new value set aside for the tuning parameters is optimal.

If this is the first iteration, then the next step is to analyze the throughput of server for LDAP search operation and store it in memory, else analyze the throughput of server for LDAP search operation and compare the throughput with the value stored in previous pass. If the difference in the value is within the tolerable limit, then the "TuningRequired" flag is set to false. This is an indication that the LDAP server and database tuning parameters are tuned to their optimal value. If the difference in the value is not within the tolerable limit, then the "TunningRequired" flag is set to true. This cycle is repeated until an optimal performance of LDAP server and values for the tuning parameters are obtained.

The Tuning Engine 750 is used to tune the directory server and database parameter. Parameters tuned by this engine include the LDAP cache, the RDBM buffer pools, and the RDBM configuration parameters. Once Analyzer engine performs its task, the Tuning Engine start its operation as follows. First, the LDAP cache is tuned based on the figures collected by analyzer engine (more details are given in FIG. 9). Then, the database buffer pool is tuned (for more detail, see FIGS. 9 and 10). Next, the database configuration parameters are tuned based on the health of these parameters computed by Analyzer Engine. If the values of the database parameters are above or below the expected values, then they are tuned.

Figure 9:
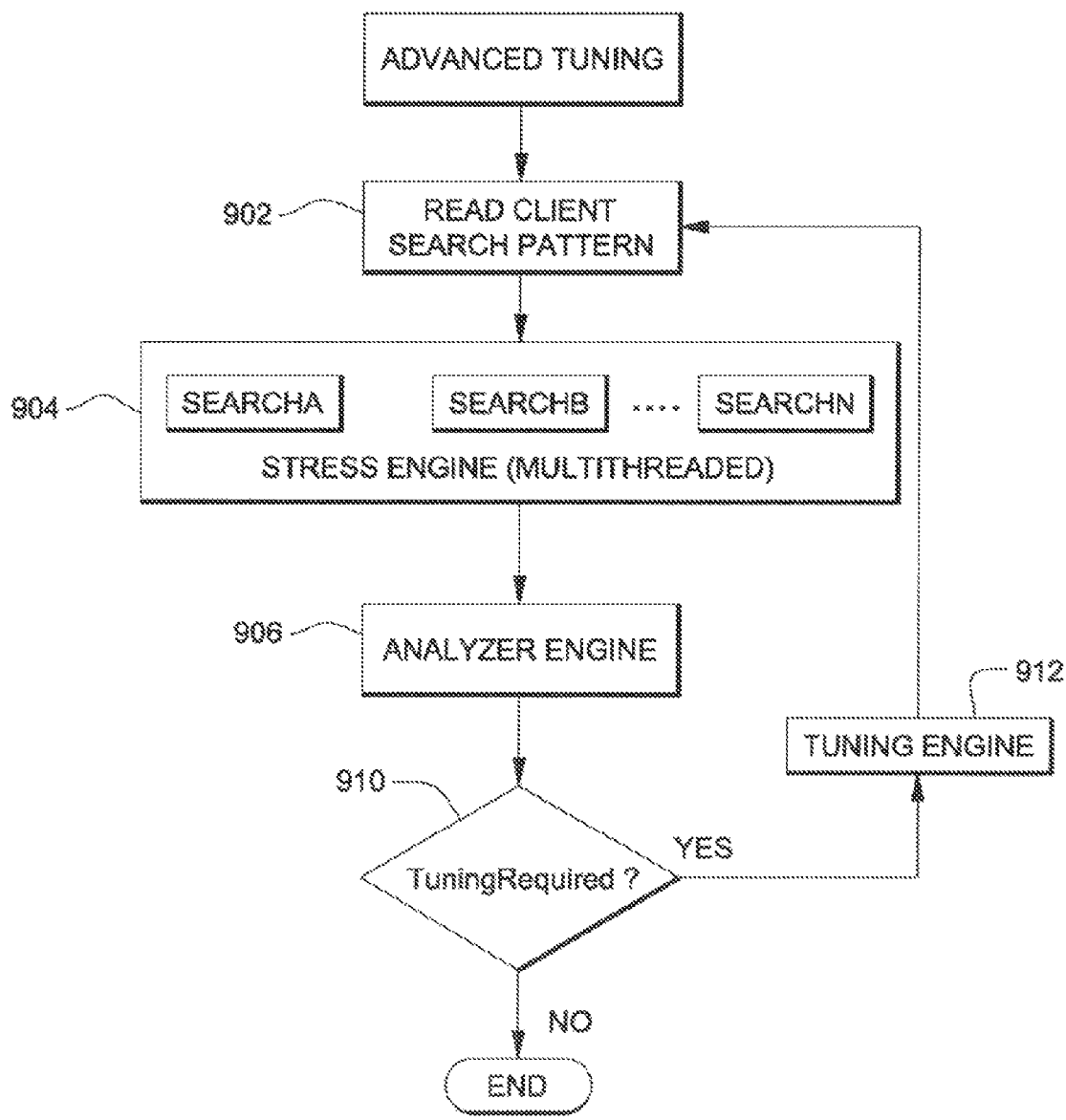
FIG. 9 describes an exemplary embodiment of the logic flow of operation performed by the Advanced Tuning Module.

FIG. 9 describes an exemplary embodiment of the logic flow for tuning RDBM performance tuning parameter. The flowchart of FIG. 9 describes the logic flow of operations performed by the Advanced Tuning module. In this procedure, a client search pattern is read at step 902, and then, at step 904, the stress engine is used to stress the server. At step 906, the Analyzer Engine is used to analyze the results of the stress test; and at step 910, it is determined whether tuning is required. If tuning is not required, the procedure of FIG. 9 ends. However, if tuning is required, then, at step 912, the Tuning Engine is invoked to perform that tuning; and after the tuning is completed, the procedure returns to step 902 and continues on from there.

Figure 10:
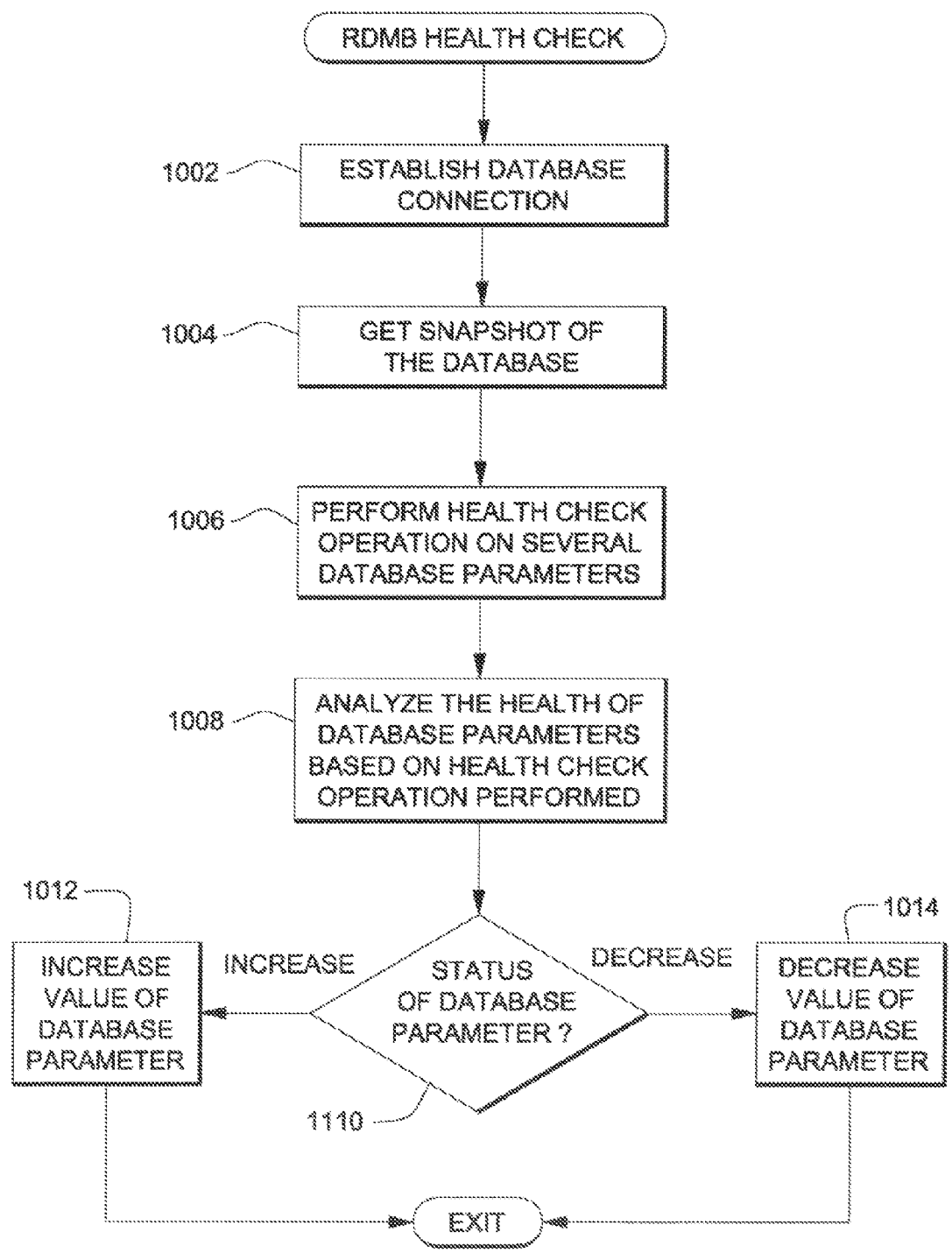
FIG. 10 illustrates an exemplary embodiment of a database health check operation that is performed in the Advanced Tuning Module.

FIG. 10 shows am exemplary embodiment of a database health check operation that is performed in the Advanced Tuning module. As will be understood a person of ordinary skill in the art, all databases generally come with a set of configurable parameters, and these parameters are used as a basis for the database health check module.

In the health check procedure illustrated in FIG. 10, at step 1002, a database connection is established, and at step 1004, a snapshot of the database is obtained. A suitable health check operation is performed on several database parameters at step 1006; and at step 1008, the health of the database parameters is analyzed based on the performed health check operation. Then, at step 1010, it is determined whether each database parameter needs to be increased or decreased. If a database parameter needs to be increased, then its value is increased at step 1012; and analogously, if a database parameter needs to be decreased, then, at step 1014, the value of that parameter is decreased.

As will be readily apparent to a person skilled in the art, embodiments of the invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled n the art, and it is intended that the appended claims cover all such modifications and embodiments as fall within the true spirit and scope of the present invention.

What is claimed is:

1. A method of autonomously tuning a Lightweight Directory Access Protocol (LDAP) server, wherein the LDAP server includes an LDAP server cache and being configured to access an LDAP database, the method comprising:
    activating a tuning thread when defined conditions are met; and
    using the tuning thread to automatically initiate a tuning procedure to tune the LDAP server cache, to tune a database buffer pool for the LDAP server, and to perform runtime tuning of given parameters of the LDAP database, wherein the defined conditions include at least one of:
    (i) reaching a specified time; and
    (ii) a cache hit ratio of the LDAP server falling below a given threshold value.

2. The method as claimed in claim 1, wherein the tuning procedure includes static tuning of the LDAP server based on the total number of entries in the LDAP database and an average size of said entries.

3. The method as claimed in claim 1, wherein the using said tuning thread includes:
    checking a defined set of parameters; and
    based on results of the checking the defined set of parameters, increasing an amount of defined memory space allocated to the LDAP server cache, and allocating all of the remaining of the defined memory space to the database buffer pool.

4. The method as claimed in claim 1, wherein the tuning procedure includes runtime tuning of the LDAP server based on real client search patterns and a type of data uploaded on the LDAP server.

5. The method as claimed in claim 4, wherein the using said tuning threads includes:
    collecting and storing real customer search patterns; and
    using the customer search patterns to stress, analyze and tune the LDAP server, the database buffer pool, and the given parameters when one of the defined conditions is met.

6. The method as claimed in claim 5, wherein the using the customer search patterns includes reading the stored search patterns, and triggering multiple searches using multiple clients and multiple threads within a same client to stress the LDAP server.

7. The method as claimed in claim 6, wherein the analyzing results of stressing the LDAP server includes:
    fetching the total number of entries and an average size of entries present in the database; and
    evaluating the health of a defined set of database parameters according to defined criteria.

8. A method for autonomous tuning of an LDAP server by the LDAP server, the method comprising:
    monitoring performance of the LDAP server during a first pass of a tuning cycle;
    identifying instructions to be executed by the LDAP server based on a pre-defined condition of the LDAP server;
    executing the identified instructions to adjust parameters of the LDAP server; and
    responsive to executing the identified instructions, monitoring performance of the LDAP server during a next pass of the tuning cycle to confirm that the performance of the LDAP server is enhanced, wherein the pre-defined condition comprises at least one of:
    (i) a time-related attribute reaching predetermined levels;
    (ii) a cache-hit ratio being less than a predetermined threshold; and
    (iii) detecting an extended operation condition, the extended operation being used to define operations performed by the LDAP server.

9. The method as claimed in claim 8, wherein identifying the instructions to be executed comprises:
    identifying a first set of instructions to be executed responsive to at least one of:
    (i) the time-related attribute reaches a predetermined level;
    (ii) the cache-hit ratio is less than a predetermined threshold; and
    identifying a second set of instructions to be executed responsive to detecting the extended operation condition.

10. A method for tuning an LDAP server, the method comprising:
    monitoring performance of the LDAP server;
    identifying instructions to be executed based on a pre-defined condition; and
    executing the identified instructions to adjust parameters of the LDAP server, whereby the performance of the LDAP server is enhanced, wherein the pre-defined condition comprises at least one of:
    (i) a time-related attribute reaching predetermined levels;
    (ii) a cache-hit ratio being less than a predetermined threshold; and
    (iii) detecting an extended operation condition, the extended operation being used to define operations performed by the LDAP server, wherein identifying the instructions to be executed comprises:
    identifying a first set of instructions to be executed responsive to at least one of:
    (i) the time-related attribute reaches a predetermined level;

(ii) the cache-hit ratio is less than a predetermined threshold; and
identifying a second set of instructions to be executed responsive to detecting the extended operation condition, wherein the first set of instructions comprises:
collecting real-time customer search patterns;
preparing a workload based on the collected search patterns;
testing stability of the LDAP server based on the prepared workload;
during testing, preparing an analysis on the stability of the LDAP server; and
adjusting the parameters of the LDAP server based on the analysis.

11. A method for tuning an LDAP server, the method comprising:
monitoring performance of the LDAP server;
identifying instructions to be executed based on a pre-defined condition; and
executing the identified instructions to adjust parameters of the LDAP server, whereby the performance of the LDAP server is enhanced, wherein the pre-defined condition comprises at least one of:
(i) a time-related attribute reaching predetermined levels;
(ii) a cache-hit ratio being less than a predetermined threshold; and
(iii) detecting an extended operation condition, the extended operation being used to define operations performed by the LDAP server, wherein identifying the instructions to be executed comprises:
identifying a first set of instructions to be executed responsive to at least one of:
(i) the time-related attribute reaches a predetermined level;
(ii) the cache-hit ratio is less than a predetermined threshold; and
identifying a second set of instructions to be executed responsive to detecting the extended operation condition, wherein the second set of instructions comprises:
computing amount of memory allocated to the LDAP server;
identifying amount of memory required to store data in the LDAP server; and
on determining the amount of memory allocated to the LDAP server being less than the amount of memory required to store the data, adjusting the parameters of the LDAP server to result in an amount of memory sufficient to store the data in the LDAP server.

12. A system of autonomously tuning a Lightweight Directory Access Protocol (LDAP) server, wherein the LDAP server includes an LDAP server cache and being configured to access an LDAP database, the system comprising at least one processor configured for:
activating a tuning thread when defined conditions are met; and
using the tuning thread to automatically initiate a tuning procedure to tune the LDAP server cache, to tune a database buffer pool for the LDAP server, and to perform runtime tuning of given parameters of the LDAP database, wherein the defined conditions include at least one of:
(i) reaching a specified time; and
(ii) a cache hit ratio of the LDAP server falling below a given threshold value.

13. The system as claimed in claim 12, wherein the tuning procedure includes static tuning of the LDAP server based on the total number of entries in the LDAP database and an average size of said entries.

14. The system as claimed in claim 12, wherein the using said tuning thread includes:
checking a defined set of parameters; and
based on results of the checking the defined set of parameters, increasing an amount of defined memory space allocated to the LDAP server cache, and allocating all of the remaining of the defined memory space to the database buffer pool.

15. The system as claimed in claim 12, wherein the tuning procedure includes runtime tuning of the LDAP server based on real client search patterns and a type of data uploaded on the LDAP server.

16. The system as claimed in claim 15, wherein the using said tuning threads is configured for:
collecting and storing real customer search patterns; and
using the customer search patterns to stress, analyze and tune the LDAP server, the database buffer pool, and the given parameters when one of the defined conditions is met.

17. The system as claimed in claim 16, wherein the using the customer search patterns includes reading the stored search patterns, and triggering multiple searches using multiple clients and multiple threads within a same client to stress the LDAP server.

18. The system as claimed in claim 17, wherein the analyzing results of stressing the LDAP server includes:
fetching the total number of entries and an average size of entries present in the database; and
evaluating the health of a defined set of database parameters according to defined criteria.

19. A system for autonomous tuning of an LDAP server by the LDAP server, the system comprising at least a processor and a memory being configured for:
monitoring performance of the LDAP server during a first pass of a tuning cycle;
identifying instructions to be executed by the LDAP server based on a pre-defined condition of the LDAP server;
executing the identified instructions to adjust parameters of the LDAP server; and
responsive to executing the identified instructions, monitoring performance of the LDAP server during a next pass of the tuning cycle to confirm that the performance of the LDAP server is enhanced, wherein the pre-defined condition comprises at least one of:
(iv) a time-related attribute reaching predetermined levels;
(v) a cache-hit ratio being less than a predetermined threshold; and
(vi) detecting an extended operation condition, the extended operation being used to define operations performed by the LDAP server.

20. The system as claimed in claim 19, wherein identifying the instructions to be executed comprises:
identifying a first set of instructions to be executed responsive to at least one of:
(iii) the time-related attribute reaches a predetermined level;
(iv) the cache-hit ratio is less than a predetermined threshold; and
identifying a second set of instructions to be executed responsive to detecting the extended operation condition.

21. A system for tuning an LDAP server, the system comprising at least a processor and a memory being configured for:
  monitoring performance of the LDAP server;
  identifying instructions to be executed based on a pre-defined condition; and
  executing the identified instructions to adjust parameters of the LDAP server, whereby the performance of the LDAP server is enhanced, wherein the pre-defined condition comprises at least one of:
  (i) a time-related attribute reaching predetermined levels;
  (ii) a cache-hit ratio being less than a predetermined threshold; and
  (iii) detecting an extended operation condition, the extended operation being used to define operations performed by the LDAP server, wherein identifying the instructions to be executed comprises:
  identifying a first set of instructions to be executed responsive to at least one of:
  (i) the time-related attribute reaches a predetermined level;
  (ii) the cache-hit ratio is less than a predetermined threshold; and
  identifying a second set of instructions to be executed responsive to detecting the extended operation condition, wherein the first set of instructions comprises:
  collecting real-time customer search patterns;
  preparing a workload based on the collected search patterns;
  testing stability of the LDAP server based on the prepared workload;
  during testing, preparing an analysis on the stability of the LDAP server; and
  adjusting the parameters of the LDAP server based on the analysis.

22. A system for tuning an LDAP server, the system comprising at least a processor and a memory being configured for:
  monitoring performance of the LDAP server;
  identifying instructions to be executed based on a pre-defined condition; and
  executing the identified instructions to adjust parameters of the LDAP server, whereby the performance of the LDAP server is enhanced, wherein the pre-defined condition comprises at least one of:
  (i) a time-related attribute reaching predetermined levels;
  (ii) a cache-hit ratio being less than a predetermined threshold; and
  (iii) detecting an extended operation condition, the extended operation being used to define operations performed by the LDAP server, wherein identifying the instructions to be executed comprises:
  identifying a first set of instructions to be executed responsive to at least one of:
  (i) the time-related attribute reaches a predetermined level;
  (ii) the cache-hit ratio is less than a predetermined threshold; and
  identifying a second set of instructions to be executed responsive to detecting the extended operation condition, wherein the second set of instructions comprises:
  computing amount of memory allocated to the LDAP server;
  identifying amount of memory required to store data in the LDAP server; and
  on determining the amount of memory allocated to the LDAP server being less than the amount of memory required to store the data, adjusting the parameters of the LDAP server to result in an amount of memory sufficient to store the data in the LDAP server.

23. A computer program product comprising a non-transitory computer readable medium having a computer usable program embodied therewith, the computer usable code configured to perform the method as claimed in claim 1.

24. A computer program product comprising a non-transitory computer readable medium having a computer usable program embodied therewith, the computer usable code configured to perform the method as claimed in claim 8.

* * * * *